(12) United States Patent
Takeuchi et al.

(10) Patent No.: US 12,311,461 B2
(45) Date of Patent: May 27, 2025

(54) FRICTION STIR WELDING TOOL AND FRICTION STIR WELDING METHOD

(71) Applicants: NTK CUTTING TOOLS CO., LTD., Komaki (JP); Osaka University, Osaka (JP)

(72) Inventors: Yuki Takeuchi, Nagoya (JP); Jun Moteki, Nagoya (JP); Hiroki Takeuchi, Nagoya (JP); Yusuke Katsu, Nagoya (JP); Yasushi Hara, Nagoya (JP); Hidetoshi Fujii, Suita (JP); Yoshiaki Morisada, Suita (JP)

(73) Assignees: NTK CUTTING TOOLS CO., LTD., Komaki (JP); Osaka University, Osaka (JP)

(*) Notice: Subject to any disclaimer, the term of this patent is extended or adjusted under 35 U.S.C. 154(b) by 0 days.

(21) Appl. No.: 18/285,965

(22) PCT Filed: Apr. 7, 2022

(86) PCT No.: PCT/JP2022/017227
§ 371 (c)(1),
(2) Date: Oct. 6, 2023

(87) PCT Pub. No.: WO2022/215720
PCT Pub. Date: Oct. 13, 2022

(65) Prior Publication Data
US 2024/0189937 A1 Jun. 13, 2024

(30) Foreign Application Priority Data
Apr. 8, 2021 (JP) ................................. 2021-065978

(51) Int. Cl.
*B23K 20/00* (2006.01)
*B23K 20/12* (2006.01)
*B23K 101/18* (2006.01)

(52) U.S. Cl.
CPC ...... *B23K 20/1255* (2013.01); *B23K 2101/18* (2018.08)

(58) Field of Classification Search
CPC .............. B23K 20/1255; B23K 20/122; B23K 20/1245
See application file for complete search history.

(56) References Cited

U.S. PATENT DOCUMENTS 10,744,592 B2    8/2020  Ikeda et al.
11,097,374 B2 *  8/2021  Fujii ..................... B23K 20/12
(Continued)

FOREIGN PATENT DOCUMENTS

CN    104646820 A    5/2015
EP    3 053 696 A    8/2016
(Continued)

OTHER PUBLICATIONS

International Search Report and Written Opinion for International Application No. PCT/JP2022/017227, mailed Jun. 14, 2022.
(Continued)

*Primary Examiner* — Erin B Saad
(74) *Attorney, Agent, or Firm* — Wolf, Greenfield & Sacks, P.C.

(57) ABSTRACT

A friction stir welding tool and a friction stir welding method that can increase the amount of heat generation, while reducing the amount of escaping heat are provided. The friction stir welding tool (1) has a shoulder portion (7) and a probe portion (5) provided on a bottom surface of the shoulder portion (7). The base material of the friction stir welding tool (1) is a ceramic material whose main phase is silicon nitride or sialon. The shoulder portion (7) has a diameter of 35 mm or greater.

5 Claims, 10 Drawing Sheets

(56) References Cited

U.S. PATENT DOCUMENTS

| | | | | |
|---|---|---|---|---|
| 11,986,901 B2* | 5/2024 | Fujii | ................... | B23K 20/227 |
| 2014/0312099 A1* | 10/2014 | Ederyd | ................... | C22C 29/08 |
| | | | | 228/2.1 |
| 2017/0297141 A1* | 10/2017 | Ikeda | ................. | B23K 20/1255 |
| 2019/0168337 A1* | 6/2019 | Fujii | ..................... | C04B 35/584 |
| 2020/0363376 A1* | 11/2020 | Abushanab | ............ | G01N 29/12 |
| 2022/0001486 A1* | 1/2022 | Fujii | ................... | B23K 20/227 |
| 2024/0189937 A1* | 6/2024 | Takeuchi | ........... | B23K 20/1255 |

FOREIGN PATENT DOCUMENTS

| | | |
|---|---|---|
| JP | 2011-011235 A | 1/2011 |
| JP | 2015-189177 A | 11/2015 |
| JP | 2016-132004 A | 7/2016 |
| JP | 2020-142293 A | 9/2020 |
| WO | WO 2016/047376 A1 | 3/2016 |

OTHER PUBLICATIONS

International Preliminary Report on Patentability for International Application No. PCT/JP2022/017227, mailed Oct. 19, 2023.
Nathan et al., Effect of Tool Shoulder Diameter on Stir Zone Characteristics of Friction Stir Welded HSLA Steel Joints. Trans Indian Institute of Metals. Aug. 16, 2015; 69(10): 1861-1869. Epub Mar. 25, 2016.

* cited by examiner

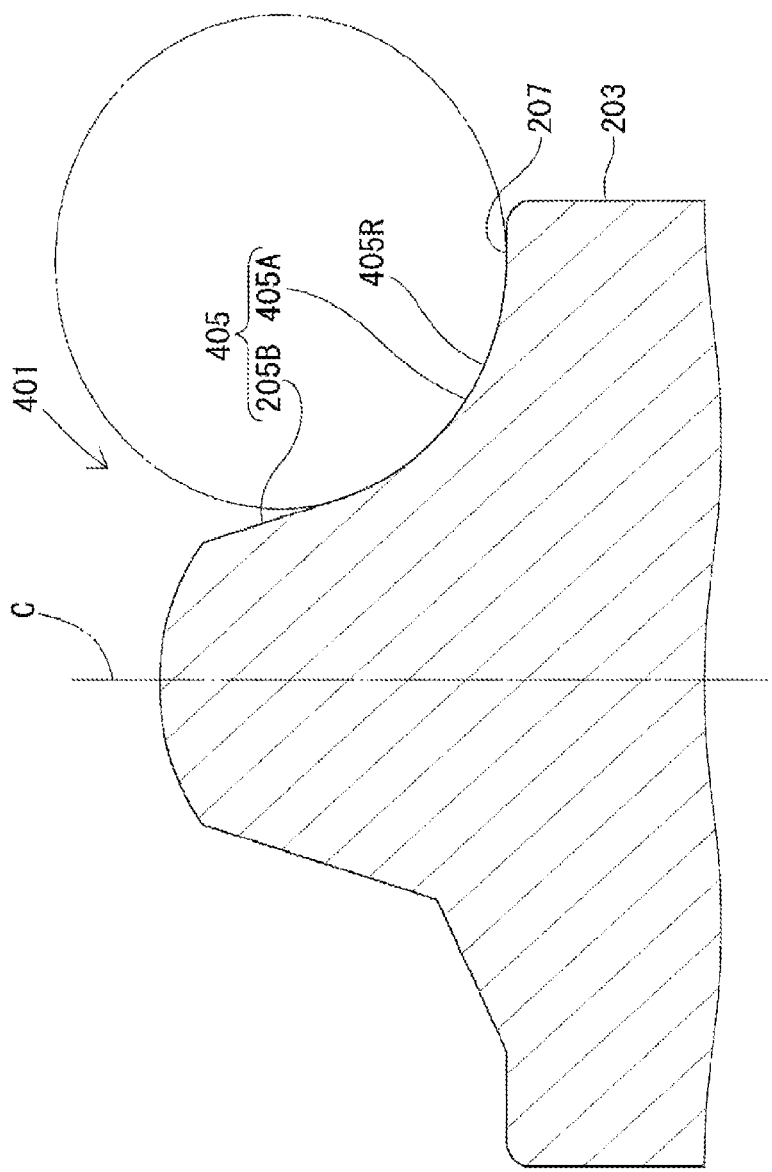

FRICTION STIR WELDING TOOL AND FRICTION STIR WELDING METHOD

CROSS-REFERENCE TO RELATED APPLICATIONS

This application is a national stage filing under 35 U.S.C. § 371 of International Application No. PCT/JP2022/017227, filed Apr. 7, 2022, which claims priority to Japanese Application No. 2021-065978, filed Apr. 8, 2021, each of which is incorporated herein by reference in its entirety.

TECHNICAL FIELD

The present disclosure relates to a friction stir welding tool and to a friction stir welding method.

BACKGROUND ART

Heretofore, friction stir welding (FSW) has been known as a method for welding metal members. Friction stir welding is a solid-state welding method in which friction heat and processing heat produced between a rotary tool and members to be welded are used for softening the members, and welding is performed by utilizing a plastic flow produced by the rotational force of the rotary tool.

The friction stir welding tool disclosed in Patent Document 1 includes a body portion having a shoulder portion, and a probe portion provided on the bottom surface of the body portion. When a backing plate and a to-be-welded member disposed on the backing plate are welded together, a rotated friction stir welding tool is pressed into the to-be-welded member from the surface side, thereby bringing the shoulder portion into contact with the to-be-welded member. As a result, a plastic flow is produced in the to-be-welded member, and thereby the backing plate and the to-be-welded member are welded together.

PRIOR ART DOCUMENT

Patent Document

Patent Document 1: Japanese Patent Application Laid-Open (kokai) No. 2020-142293

SUMMARY OF THE INVENTION

Problem to be Solved by the Invention

Friction stir welding is in the stage of practical use for welding of thin plates formed of a metal whose melting point is relatively low and whose resistance to plastic deformation is small, such as Al (aluminum), Mg (magnesium), or the like. There has been demand for application of friction stir welding to, for example, welding of thick plates, such as steel plates, which are formed of a metal material whose melting point is relatively high. Accordingly, there has been demand for a friction stir welding tool having a structure that can realize a sufficient amount of heat generation (a sufficient amount of heat input).

The present disclosure has been made in consideration of the above-described circumstances, and an object is to provide a friction stir welding tool and a friction stir welding method that can increase the amount of heat generation while reducing the amount of escaping heat. The present disclosure can be realized as the following modes.

Means for Solving the Problem

[1] A friction stir welding tool having a shoulder portion and a probe portion provided on a bottom surface of the shoulder portion, wherein
a ceramic material whose main phase is silicon nitride or sialon is used as a base material, and
a diameter of the shoulder portion is 35 mm or greater.
[2] The friction stir welding tool, wherein a ratio of a height of the probe portion to the diameter of the shoulder portion is 0.5 or less.
[3] The friction stir welding tool, wherein a ratio of a diameter of the probe portion at its root to the diameter of the shoulder portion is 0.67 or less.
[4] The friction stir welding tool having a coating layer formed of TiN.
[5] The friction stir welding tool, wherein the probe portion includes a skirt region that expands toward the bottom surface of the shoulder portion,
wherein the skirt region has a region where a ratio of increase in outer diameter to height is larger as compared with a region of the probe portion other than the skirt region, and
wherein, in a cross section containing a center axis of the probe portion, at least one pair of straight portions that are symmetric with respect to the center axis and that satisfy the following conditions (1) and (2) appear in visible outlines of the skirt region:
condition (1): in the cross section, a distance between a point of intersection where a straight line containing the straight portion intersects with a straight line containing a visible outline of the region of the probe portion other than the skirt region, and a straight line passing through two points where a pair of straight lines containing the visible outlines of the region of the probe portion other than the skirt region intersect with a straight line containing the bottom surface of the shoulder portion, is 12% or greater and 55% or less of the height of the probe portion; and
condition (2): a taper angle between the pair of straight portions is 60° or greater and 160° or less.
[6] A friction stir welding method in which plates having a thickness of 15 mm or greater are welded together by the friction stir welding tool.

Effects of the Invention

The friction stir welding tool of the present disclosure can increase the amount of heat generation (the amount of heat input) because the diameter of the shoulder portion is set to 35 mm or greater. Setting the diameter of the shoulder portion to 35 mm or greater may raise a concern about an increase in the amount of heat escaping from the friction stir welding tool. In view of this, the base material of the friction stir welding tool is a ceramic material whose main phase is silicon nitride or sialon, which have relatively small heat conductivities. Therefore, the amount of heat escaping from the friction stir welding tool can be reduced.

In the case where the ratio of the height of the probe portion to the diameter of the shoulder portion is 0.5 or less, the size of the probe portion becomes relatively small, and the friction stir welding tool becomes less likely to break.

In the case where the ratio of the diameter of the probe portion at its root to the diameter of the shoulder portion is 0.67 or less, the diameter of the probe portion at its root can be made relatively small, and generation of burrs at the time of welding can be reduced. Thus, the welding strength attained when welding is performed by using the friction stir welding tool can be increased.

In the case where the friction stir welding tool has a coating layer formed of TiN, wear resistance of the friction stir welding tool can be enhanced.

In the case where the probe portion includes the skirt region that expands toward the bottom surface of the shoulder portion, and the skirt region is larger than the region other than the skirt region in terms of the ratio of increase in outer diameter to height, a fillet portion can be formed at the connecting portion between the probe portion and the shoulder portion, and thereby the wear resistance can be enhanced. Furthermore, effects described below are yielded in the case where the skirt region is configured in such a manner that, in a cross section containing a center axis of the probe portion, at least one pair of straight portions that are symmetric with respect to the center axis appear in visible outlines of the skirt region; and, in the above-described cross section, a distance between a point of intersection where a straight line containing the straight portion intersects with a straight lines containing a visible outlines of the region of the probe portion other than the skirt region, and a straight line passing through two points where a pair of straight lines containing the visible outlines of the region of the probe portion other than the skirt region intersect with a straight line containing the bottom surface of the shoulder portion, is 12% or greater and 55% or less of the height of the probe portion (condition (1)); and the taper angle between the pair of straight portions 60° or greater and 160° or less (condition (2)). By virtue of the provision of the skirt region, a portion of the probe portion where the diameter increases does not become excessively large, so that the load acting on a welding apparatus which moves the tool can be reduced. In addition, the bottom surface of the shoulder portion does not become excessively small, so that a flowing material can be easily pressed down.

In the case of the friction stir welding method of the present disclosure in which plates having a thickness of 15 mm or greater are welded together by using the friction stir welding tool, welding of plates having a thickness of 15 mm or greater which are difficult to weld can be realized.

BRIEF DESCRIPTION OF THE DRAWINGS

FIG. 10 Perspective view showing one example of a friction stir welding tool of still another embodiment.

MODES FOR CARRYING OUT THE INVENTION

The present invention will next be described in detail. As used herein, unless otherwise specified, the numerical value range expressed by "(value) to (value)" includes the lower limit and the upper limit of the range. For example, the expression "10 to 20" includes both a lower limit of "10" and an upper limit of "20." That is, "10 to 20" is equivalent to "10 or greater and 20 or less."

1. First Embodiment (1) Friction Stir Welding Tool

Figure 1:
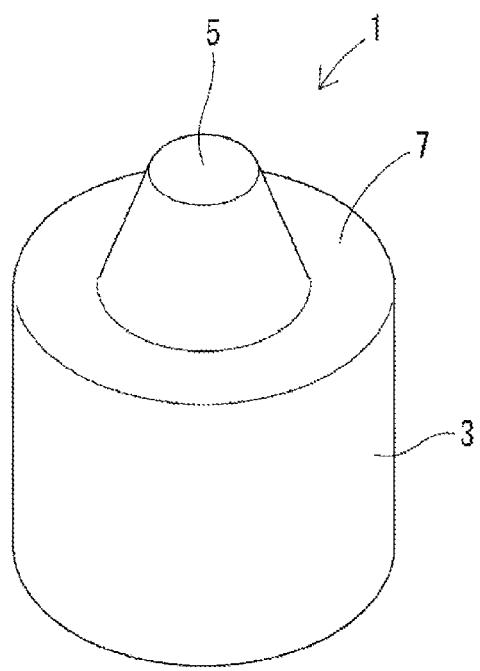
FIG. 1 Perspective view showing one example of a friction stir welding tool of a first embodiment.

FIG. 1 shows one example of a friction stir welding tool 1 of a first embodiment. As shown in FIG. 1, the friction stir welding tool 1 includes a body portion 3 and a probe portion 5. The body portion 3 has a shoulder portion 7. The probe portion 5 is provided on a bottom surface (upper bottom surface) of the shoulder portion 7.

The diameter of the probe portion 5 decreases continuously from the bottom surface (upper bottom surface) of the shoulder portion 7 toward a distal end of the probe portion 5. The taper angle of the probe portion 5 can be set to, for example, 10°. However, so long as the effect of the present invention is not impaired, no particular limitation is imposed on the taper angle. It is preferred that grooving chamfering, or the like be not performed on the probe portion 5. Needless to say, the diameter of the probe portion 5 may be constant from the bottom surface (upper bottom surface) of the shoulder portion 7 to a position near the distal end of the probe portion 5.

The base material of the friction stir welding tool 1 is a ceramic material whose main phase is silicon nitride or sialon. So long as the effect of the present invention is not impaired, no particular limitation is imposed on the ceramic material which is the base material of the friction stir welding tool 1 and whose main phase is silicon nitride or sialon, and the ceramic material may be any of conventionally known various types of silicon nitride-based ceramic materials and sialon-based ceramic materials. The friction stir welding tool 1 may contain a sintering aid.

It is preferred that the friction stir welding tool 1 have a coating layer (not shown). Specifically, it is preferred that the surface of the probe portion 5 and/or the surface of the shoulder portion 7 be covered with a coating layer. The coating layer is a hard film formed by means of, for example, PVD, CVD, or the like. The coating layer is preferably formed of TiN.

Figure 2:
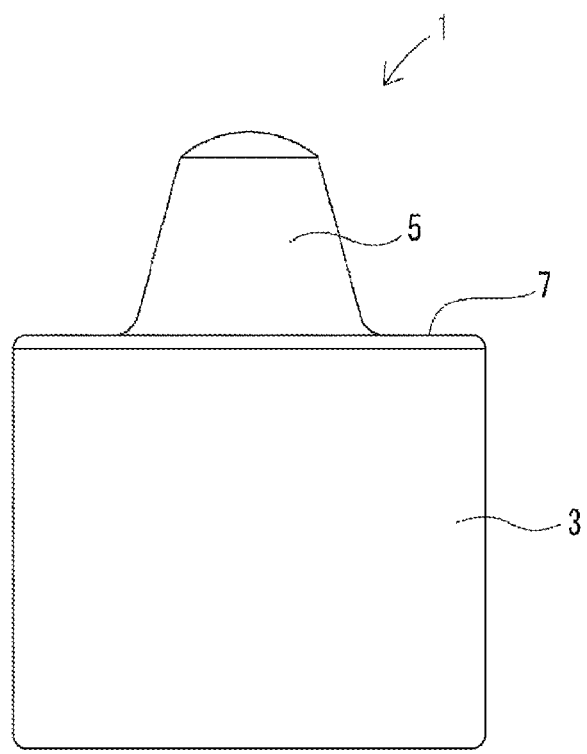
FIG. 2 Side view of the friction stir welding tool of FIG. 1.
Figure 3:
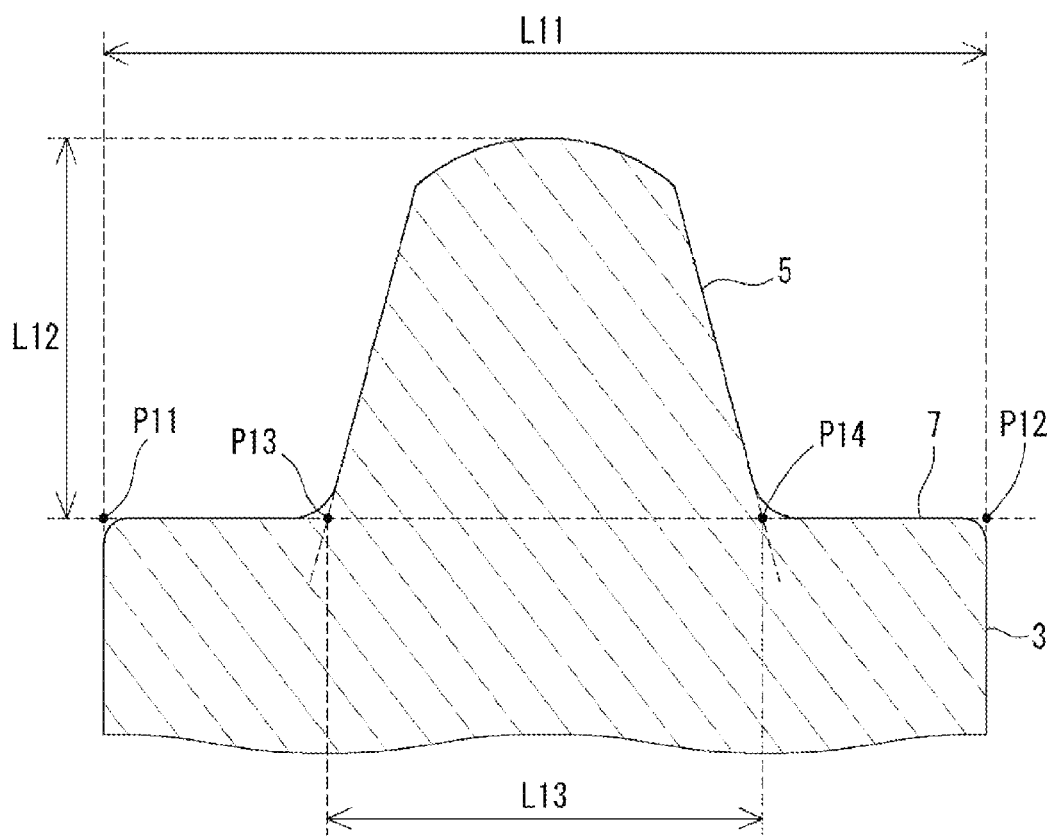
FIG. 3 Side sectional view of the friction stir welding tool of FIG. 1.
Figure 4:
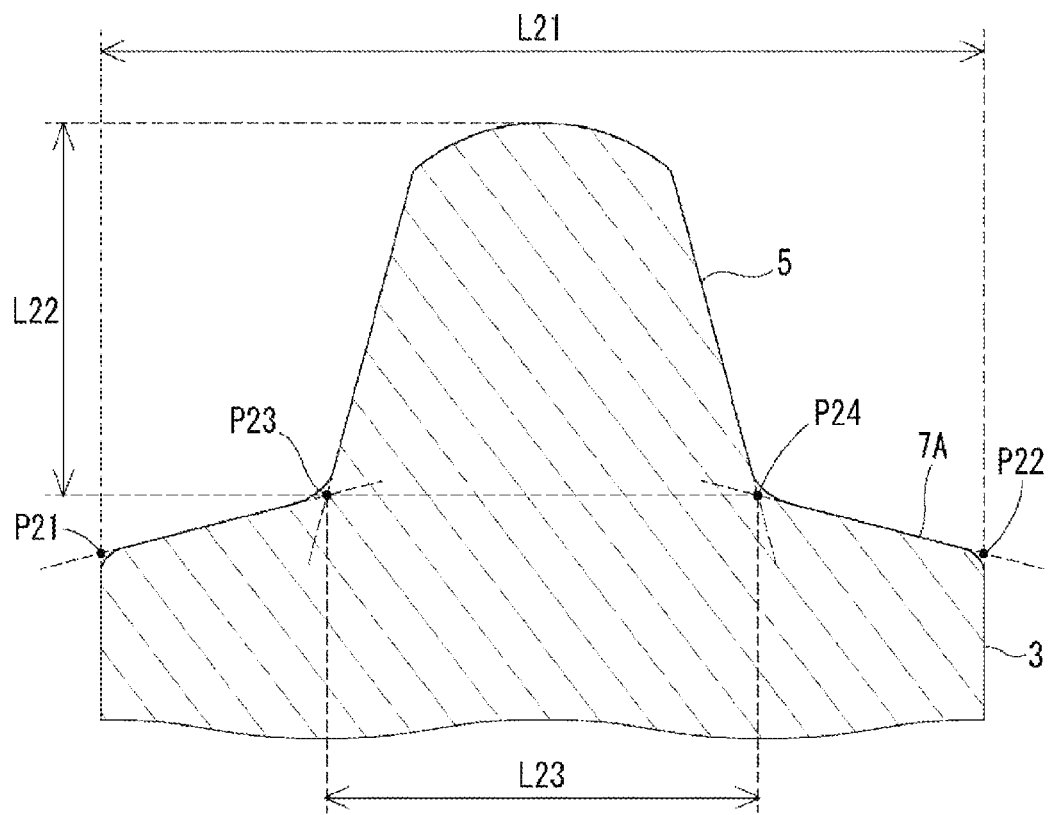
FIG. 4 Side sectional view of a friction stir welding tool having a shape different from the shape shown in FIG. 1.
Figure 5:
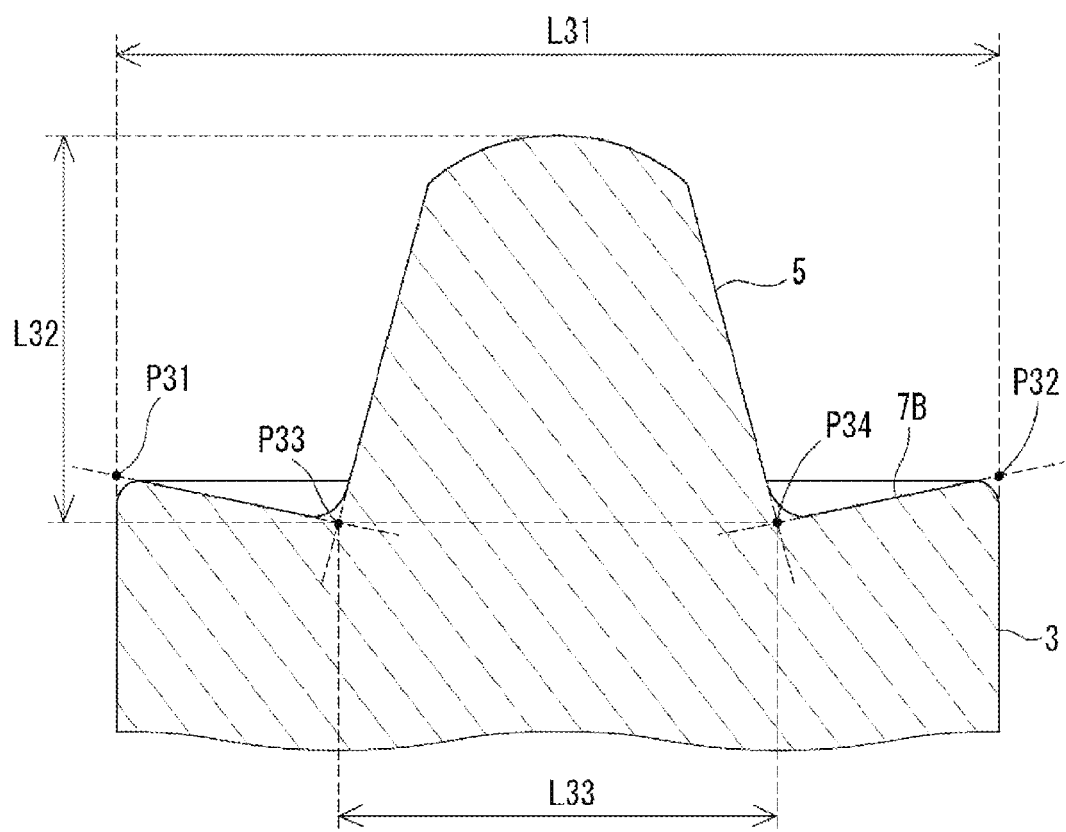
FIG. 5 Side sectional view of a friction stir welding tool having a shape different from the shapes shown in FIGS. 1 and 4.

FIG. 3 shows a cross section of the friction stir welding tool 1 shown in FIGS. 1 and 2 taken along a plane containing a center axis. In the friction stir welding tool 1 shown in FIG. 3, in the cross section shown in FIG. 3, the diameter of the shoulder portion 7 is equal to a distance L11 between points P11 and P12 where an extension line of the bottom surface (upper bottom surface) of the shoulder portion 7 and extension lines of the side surface (generating lines) of the body portion 3 intersect with each other. FIGS. 4 and 5 are sectional views similar to FIG. 3, each of which shows a cross section of a friction stir welding tool 1 having a shape different from that shown in FIG. 3. In the friction stir welding tool 1 shown in FIG. 4, a shoulder portion 7A ascends toward the distal end side of the probe portion 5 from the outer circumference toward the inner circumference thereof. In the cross section shown in FIG. 4, the diameter of the shoulder portion 7A is equal to a distance L21 between points P21 and P22 where the bottom surface (upper bottom surface) of the shoulder portion 7A and the side surface (generating lines) of the body portion 3 intersect with each other. In a friction stir welding tool 1 shown in FIG. 5, a shoulder portion 7B descends toward the side opposite the distal end of the probe portion 5 from the outer circumference toward the inner circumference thereof. In the cross section shown in FIG. 5, the diameter of the shoulder portion 7B is equal to a distance L31 between points P31 and P32 where the bottom surface (upper bottom surface) of the shoulder portion 7B and the side surface (generating lines) of the body portion 3 intersect with each other.

From the viewpoint of increasing the amount of heat generation, the diameter of the shoulder portion 7 is 35 mm or greater, preferably 37 mm or greater, more preferably 42 mm or greater. From the viewpoint of restraining escape of heat, the diameter of the shoulder portion 7 is 50 mm or less, preferably 45 mm or less. From these viewpoints, the diameter of the shoulder portion 7 falls within the range of 35 mm to 50 mm, preferably within the range of 37 mm to 45 mm, more preferably within the range of 42 mm to 45 mm.

In the friction stir welding tool 1 shown in FIG. 3, in the cross section shown in FIG. 3, the height of the probe portion 5 is equal to the distance (shortest distance) L12 between the distal end (apex) of the probe portion 5 and a straight line that passes through points P13 and P14 where extension lines of generating lines of straight portions of the probe portion 5 and the extension line of the bottom surface (upper bottom surface) of the shoulder portion 7 intersect with each other. In the friction stir welding tool 1 shown in FIG. 4, in the cross section shown in FIG. 4, the height of the probe portion 5 is equal to the distance (shortest distance) L22 between the distal end (apex) of the probe portion 5 and a straight line that passes through points P23 and P24 where the extension lines of the generating lines of the straight portions of the probe portion 5 and the extension line of the bottom surface (upper bottom surface) of the shoulder portion 7A intersect with each other. In the friction stir welding tool 1 shown in FIG. 5, in the cross section shown in FIG. 5, the height of the probe portion 5 is equal to the distance (shortest distance) L32 between the distal end (apex) of the probe portion 5 and a straight line that passes through points P33 and P34 where the extension lines of the generating lines of the straight portions of the probe portion 5 and the extension line of the bottom surface (upper bottom surface) of the shoulder portion 7B intersect with each other.

From the viewpoint of preventing breakage of the tool, the ratio of the height of the probe portion 5 to the diameter of the shoulder portion 7 is preferably 0.5 or less, more preferably 0.45 or less, further preferably 0.40 or less. From the viewpoint of preventing generation of defects, the ratio of the height of the probe portion 5 to the diameter of the shoulder portion 7 is preferably 0.20 or greater, more preferably 0.30 or greater, further preferably 0.35 or greater. From these viewpoints, the ratio of the height of the probe portion 5 to the diameter of the shoulder portion 7 falls preferably within the range of 0.20 to 0.5, more preferably within the range of 0.30 to 0.45, further preferably within the range of 0.35 to 0.40.

In the friction stir welding tool 1 shown in FIG. 3, in the cross section shown in FIG. 3, the diameter of the probe portion 5 at its root is equal to the distance L13 between points P13 and P14 where the extension lines of the generating lines of the straight portions of the probe portion 5 and the extension line of the bottom surface (upper bottom surface) of the shoulder portion 7 intersect with each other. In the friction stir welding tool 1 shown in FIG. 4, in the cross section shown in FIG. 4, the diameter of the probe portion 5 at its root is equal to the distance L23 between points P23 and P24 where the extension lines of the generating lines of the straight portions of the probe portion 5 and the extension line of the bottom surface (upper bottom surface) of the shoulder portion 7A intersect with each other. In the friction stir welding tool 1 shown in FIG. 5, in the cross section shown in FIG. 5, the diameter of the probe portion 5 at its root is equal to the distance L33 between points P33 and P34 where the extension lines of the generating lines of the straight portions of the probe portion 5 and the extension line of the bottom surface (upper bottom surface) of the shoulder portion 7B intersect with each other.

From the viewpoint of preventing generation of burrs, the ratio of the diameter of the probe portion 5 at its root to the diameter of the shoulder portion 7 is preferably 0.67 or less, more preferably 0.60 or less, further preferably 0.50 or less. From the viewpoint of securing the strength of the probe portion 5, the ratio of the diameter of the probe portion 5 at its root to the diameter of the shoulder portion 7 is preferably 0.30 or greater, more preferably 0.40 or greater. From these viewpoints, the ratio of the diameter of the probe portion 5 at its root to the diameter of the shoulder portion 7 falls preferably within the range of 0.30 to 0.67, more preferably within the range of 0.40 to 0.60, further preferably within the range of 0.40 to 0.50.

(2) Friction Stir Welding Method

Figure 6:
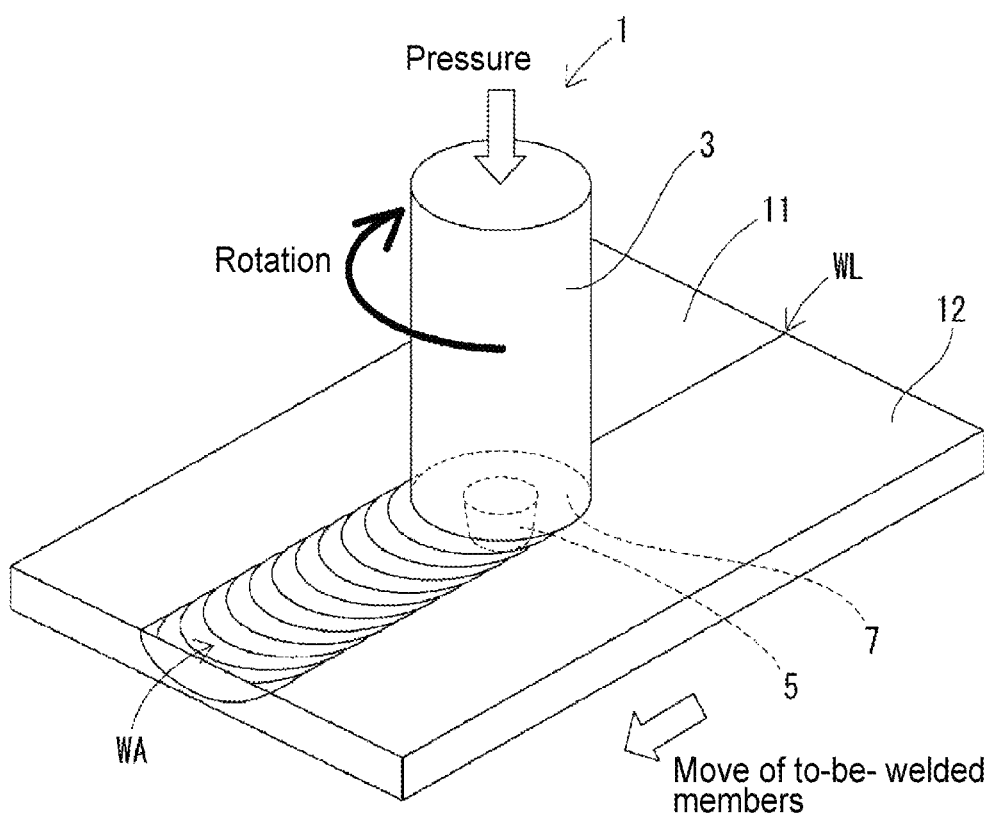
FIG. 6 Perspective view used for describing the state of use of the friction stir welding tool of FIG. 1.

FIG. 6 is an explanatory view showing one example of a friction stir welding method performed by using the friction stir welding tool 1 of the first embodiment. The friction stir welding tool 1 is attached to an unillustrated welding apparatus when used. Upon receipt of pressure from the welding apparatus, the probe portion 5 of the friction stir welding tool 1 is pressed, while rotating, onto a welding line WL, which is the boundary between to-be-welded members 11 and 12. After that, while the state in which the probe portion 5 has been pressed onto the to-be-welded members 11 and 12 is maintained, the to-be-welded members 11 and 12 move relatively with respect to the friction stir welding tool 1 in a direction indicated by an outline arrow in FIG. 6. As a result, the friction stir welding tool 1 moves relatively along the welding line WL. Steel plates may be used as the to-be-welded members 11 and 12. However, any of other metals may be used instead of steel. Due to heat generated as a result of friction between the to-be-welded members 11 and 12 and the probe portion 5, portions of the to-be-welded members 11 and 12 near the welding line WL are fluidized plastically. The plastically fluidized portions of the to-be-welded members 11 and 12 are stirred by the probe portion 5, and thereby a welded area WA is formed. By this welded area WA, the to-be-welded members 11 and 12 are joined together.

(3) Effects

Friction stir welding is in the stage of practical use for Al (aluminum) and Mg (magnesium), whose melting points are relatively low and whose resistance to plastic deformation is small. However, problems still remain for application to steel plates whose melting point is relatively high and that have large thicknesses. For example, Japanese Patent Application Laid-Open No. 2020-142293 discloses a friction stir welding method for welding steel plates. In this friction stir welding method, the thickness of steel plates is limited to 10 mm or less, and its application is limited. When steel plates of 15 mm thick were actually welded together at a practical welding speed (50 mm/min) by using the friction stir welding tool disclosed in Japanese Patent Application Laid-Open No. 2020-142293, the state of welding was unsatisfactory. One considerable measure for welding thick steel plates without defect is increasing the length of the probe. However, in this case, the risk of probe breakage increases. Therefore, it has been desired to increase the strength of the friction stir welding tool.

Conceivably, one reason for breakage of the friction stir welding tool is that the friction stir welding tool moves in a state in which friction heat is insufficient and the steel plates have not yet softened sufficiently. As a result, stresses act on the friction stir welding tool (in particular, the probe portion). Therefore, the amount of heat input to the steel plates (hereinafter referred to as "the amount of heat input") is important. As shown by the following Expression (1), the amount of heat input is in proportion to the pressure P (N/m$^3$) of a stirring portion, the number of revolutions N (s$^{-1}$) of the tool, and the cube of the diameter R (m) of the shoulder portion. Expression (2) is converted from Expression (1). μ represents a coefficient of friction, and L represents a load (N).

[Mathematical Expression 1]

$$Q = \frac{4}{3}\pi^2 \mu P N R^3 \quad \text{Expression (1)}$$

[Mathematical Expression 2]

$$Q = \frac{16}{3}\pi \mu L N R \quad \text{Expression (2)}$$

Since the pressure P of the stirring portion and the number of revolutions N of the tool greatly influence the welding state, wear of the tool, and the load applied to a welding apparatus, it is effective to increase the diameter of the shoulder portion, instead of increasing the pressure P and the number of revolutions N. In view of this, in the friction stir welding tool 1 of the first embodiment, the diameter of the shoulder portion 7 is set to 35 mm or greater, and thereby the amount of heat generation (the amount of heat input) is increased. As a result of increasing the diameter of the shoulder portion 7, the amount of heat input increases, so that, even at a practical welding speed, the steel plates are softened to a sufficient degree. Therefore, the stress generated in the friction stir welding tool 1 becomes smaller, so that welding can be performed while preventing breakage of the friction stir welding tool 1.

Setting the diameter of the shoulder portion 7 to a relatively large value (35 mm or greater) may raise a concern about an increase in the amount of heat escaping from the friction stir welding tool 1. However, since the base material of the friction stir welding tool 1 is a ceramic material whose main phase is silicon nitride or sialon, which have relatively small heat conductivities, the amount of heat escaping from the friction stir welding tool 1 can be reduced.

In order to reduce the amount of heat escaping from the friction stir welding tool 1, the heat conductivity of the base material that constitutes the friction stir welding tool 1 is preferably 33 W/m·K or less, more preferably 23 W/m·K or less, further preferably 18 W/m·K or less.

In the friction stir welding tool 1 of the first embodiment, the ratio of the height of the probe portion 5 to the diameter of the shoulder portion 7 is 0.5 or less. By virtue of this configuration, the size of the probe portion 5 becomes relatively small, and the friction stir welding tool 1 becomes less likely to break.

In the friction stir welding tool 1 of the first embodiment, the ratio of the diameter of the probe portion 5 at its root to the diameter of the shoulder portion 7 is 0.67 or less. By virtue of this configuration, the diameter of the probe portion 5 at its root can be made relatively small, and generation of burrs at the time of welding can be reduced. Thus, the welding strength attained when welding is performed by using the friction stir welding tool 1 can be increased.

The friction stir welding tool 1 of the first embodiment has a coating layer formed of TiN. By virtue of this configuration, wear resistance of the friction stir welding tool 1 can be enhanced.

In the friction stir welding method of the first embodiment, plates having a thickness of 15 mm or greater are welded together by using the friction stir welding tool 1. This configuration can realize welding of plates having a thickness of 15 mm or greater which are difficult to weld.

Examples

The first embodiment will be described further specifically by way of examples.

(1) Friction Stir Welding Tool

A material containing a "sialon phase" and a "grain boundary phase" was used as the base materials of the friction stir welding tools of Examples 1 and 2 and Comparative example 1. The "sialon phase" contains α sialon and β sialon represented by $Si_{6-z}Al_zO_zN_{8-z}$. The value of Z is 0.2 or greater and 0.7 or less. The "grain boundary phase" is a portion where the boundaries between crystal grains appear.

Parameters relating to the shapes of the friction stir welding tools of Examples 1 and 2 and Comparative example 1 are shown in Table 1 shown below. The diameter of the shoulder portion of the friction stir welding tool of Example 1 was 37.5 mm. The diameter of the shoulder portion of the friction stir welding tool of Example 2 was 42.5 mm. The diameter of the shoulder portion of the friction stir welding tool of Comparative example 1 was 30.0 mm.

TABLE 1

| | Diameter of shoulder portion (mm) | Height of probe portion (mm) | Diameter of probe portion at root (mm) | Height of probe portion/ Diameter of shoulder portion | Diameter of probe portion at root/ Diameter of shoulder portion | Welding distance (mm) | Surface defect | Tool breakage |
|---|---|---|---|---|---|---|---|---|
| Ex. 1 | 37.5 | 14.75 | 18.49 | 0.39 | 0.49 | 500 | No defect | Not occurred |
| Ex. 2 | 42.5 | 12.63 | 17.46 | 0.30 | 0.41 | 900 | No defect | Not occurred |

TABLE 1-continued

| | Diameter of shoulder portion (mm) | Height of probe portion (mm) | Diameter of probe portion at root (mm) | Height of probe portion/ Diameter of shoulder portion | Diameter of probe portion at root/ Diameter of shoulder portion | Welding distance (mm) | Surface defect | Tool breakage |
|---|---|---|---|---|---|---|---|---|
| Comp. Ex. 1 | 30.0 | 14.75 | 18.49 | 0.49 | 0.62 | 500 | No defect | Occurred |

(2) Welding Conditions

Friction stir welding was performed for 15 mm-thick steel plates (low carbon steel) by using the friction stir welding tools of Examples 1 and 2 and Comparative example 1. Welding was performed along the boundary between the two steel plates (abutting surfaces of the two steel plates). The rotational speed of the friction stir welding tool was 200 rpm, the welding speed was 50 mm/min, and the advance angle was 1°.

(3) Results

The results are also described in Table 1 and the results are considered.

Examples 1 and 2 satisfy the following requirement (a). Comparative example 1 does not satisfy the following requirement (a).

Requirement (a): The diameter of the shoulder portion is 35 mm or greater.

Since the friction stir welding tool of Example 1 satisfies the requirement (a), the friction stir welding tool of Example 1 was able to perform surface defect-free welding over 500 mm without causing tool breakage. Since the friction stir welding tool of Example 2 satisfies the requirement (a), the friction stir welding tool of Example 2 was able to perform surface defect-free welding over 900 mm without causing tool breakage. Meanwhile, the friction stir welding tool of Comparative example 1 does not satisfy the requirement (a), and a part of the friction stir welding tool of Comparative example 1 was broken after welding over 500 mm. Conceivably, the above results occurred because, in Examples 1 and 2, in particular in Example 2, the amount of heat input to steel plates was larger as compared with that in Comparative example 1.

(4) Effect of Examples

Examples 1 and 2 enable welding of steel plates of 15 mm thick, thereby expanding the range of industrial application.

2. Second Embodiment (1) Friction Stir Welding Tool

Figure 7:
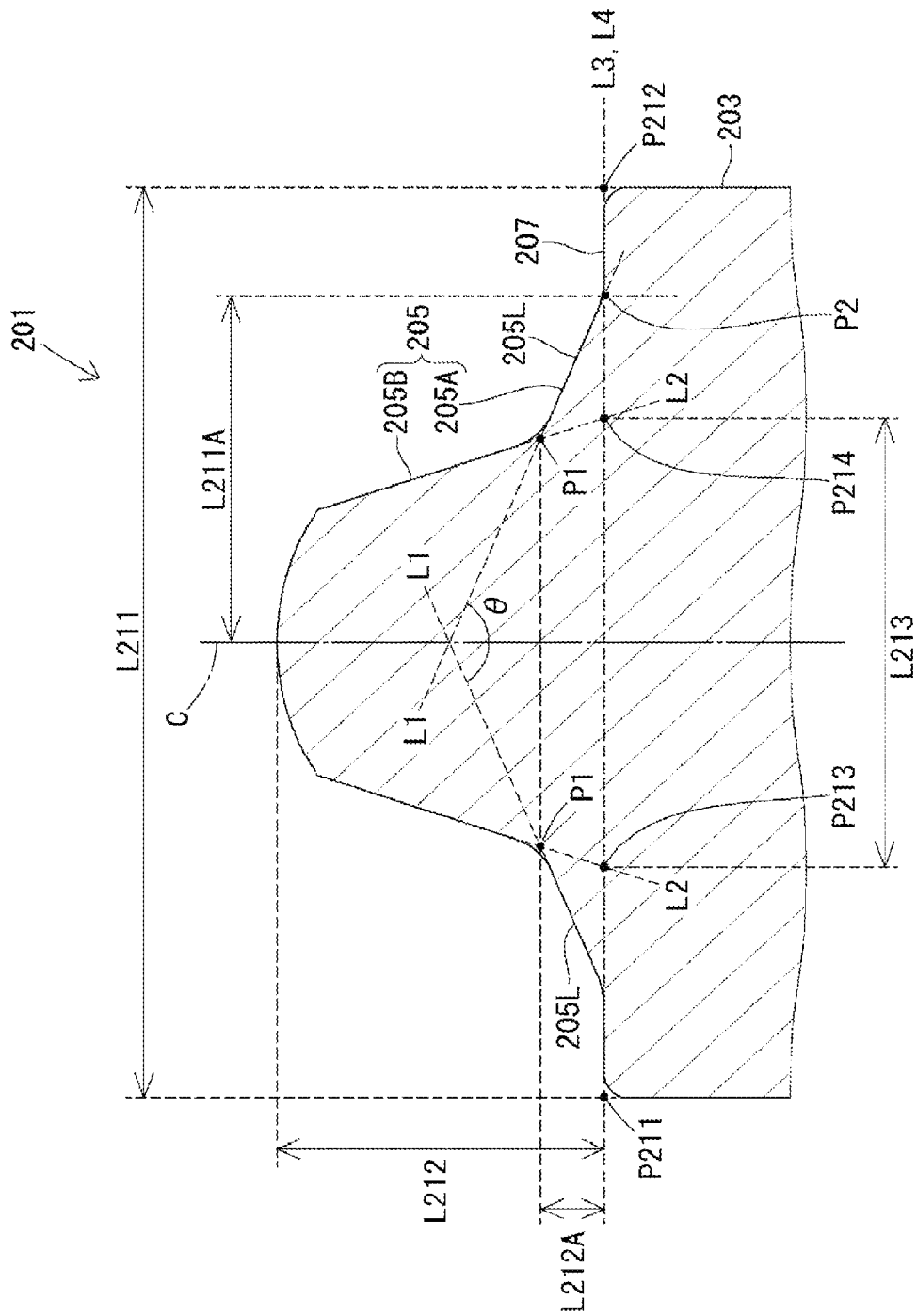
FIG. 7 Perspective view showing one example of a friction stir welding tool of a second embodiment.

FIG. 7 shows one example of a friction stir welding tool 201 of a second embodiment. FIG. 7 shows a cross section of the friction stir welding tool 201 taken along a plane containing a center axis C. As shown in FIG. 7, the friction stir welding tool 201 includes a body portion 203 and a probe portion 205. The body portion 203 has a shoulder portion 207. The probe portion 205 is provided on a bottom surface (upper bottom surface) of the shoulder portion 207.

The diameter of the probe portion 205 decreases continuously from the bottom surface (upper bottom surface) of the shoulder portion 207 toward a distal end of the probe portion 205. It is preferred that grooving, chamfering, or the like be not performed on the probe portion 205.

The probe portion 205 includes a skirt region 205A and a distal-end-side region 205B. The skirt region 205A is provided on the proximal end side of the probe portion 205 (on the body portion 203 side). The skirt region 205A expands toward the bottom surface (upper bottom surface) of the shoulder portion 207. The skirt region 205A has an approximately truncated conical shape such that its outer diameter increases gradually from the distal end side toward the bottom surface of the shoulder portion 207.

The distal-end-side region 205B is a region other than the skirt region 205A. The distal-end-side region 205B is provided on the probe portion 205 to be located on the upper end side compared to the skirt region 205A. The distal-end-side region 205B has an approximately truncated conical shape such that its outer diameter increases gradually from the distal end side toward the bottom surface of the shoulder portion 207. The distal-end-side region 205B has a rounded distal end.

The skirt region 205A is larger than the distal-end-side region 205B of the probe portion 205 in terms of the ratio of increase in outer diameter to height.

In the cross section shown in FIG. 7, a pair of straight portions 205L which are symmetric with respect to the center axis C, appear in the visible outlines of the skirt region 205A. The straight portions 205L satisfy the following conditions (1) and (2).

Condition (1): In the cross section taken along the plane containing the center axis C (the cross section shown in FIG. 7), the distance between a point of intersection P1 and a straight line L4 is 12% or greater and 55% or less of the height of the probe portion 205. P1 is a point of intersection where a straight line L1 containing the straight portion 205L intersects with a straight lines L2 containing visible outline of a region (the distal-end-side region 205B) of the probe portion 205 other than the skirt region 205A. The straight line L4 is a straight line passing through two points (points P213 and P214) where a pair of straight lines L2 containing the visible outlines of the region (the distal-end-side region 205B) of the probe portion 205 other than the skirt region intersect with a straight line L3 containing the bottom surface (upper bottom surface) of the shoulder portion 207.

Condition (2): The taper angle between the pair of straight portions 205L falls within the range of 60° to 160°.

The height of the probe portion 205 in Condition (1) is defined as follows. In the cross section shown in FIG. 7, when points where the extension lines L2 of generating lines of the distal-end-side region 205B (straight lines containing the visible outlines) of the probe portion 205 intersect with the extension line L3 of the bottom surface (upper bottom surface) of the shoulder portion 207 are denoted by P213 and P214, the height of the probe portion 205 is equal to the distance (shortest distance) L212 between the straight line L4, which passes through the points P213 and P214, and the distal end (apex) of the probe portion 205. The distance (shortest distance) between the point of intersection P1 and the straight line L4 passing through the points P213 and P214 is defined as a distance L212A, P1 being the point of intersection where the straight line L1 containing the straight portion 205L intersects with the straight line L2 containing the visible outline of the distal-end-side region 205B. The ratio of the distance L212A to the distance L212 falls within the range of 12% to 55%, preferably within the range of 15% to 45%, further preferably within the range of 17% to 41%.

In Condition (2), the taper angle θ between the pair of straight portions 205L is a larger one of the vertical angles between the extension lines of the two straight portions 205L intersecting with each other. From the viewpoint of preventing the ratio of the distal-end-side region 205B in the probe portion 205 from becoming excessively small, the taper angle between the straight portions 205L is 60° or greater, preferably 70° or greater, more preferably 80° or greater. From the viewpoint of preventing the bottom surface (upper bottom surface) of the shoulder portion 207 from becoming excessively small, the taper angle between the straight portions 205L is 160° or less, preferably 155° or less, more preferably 150° or less. From these viewpoints, the taper angle between the straight portions 205L falls within the range of 60° to 160°, preferably within the range of 70° to 155°, more preferably within the range of 80° to 150°.

In the friction stir welding tool 201, in the cross section shown in FIG. 7, the diameter of the shoulder portion 207 is equal to the distance L211 between points P211 and P212 where the extension line L3 of the bottom surface (upper bottom surface) of the shoulder portion 207 intersects with extension lines of the side surface (generating lines) of the body portion 203. In the cross section shown in FIG. 7, a point where the straight line L1 containing the straight portion 205L intersects with the extension line L3 of the bottom surface (upper bottom surface) of the shoulder portion 207 is denoted by P2. The distance between the point P2 and the center axis C is denoted by L211A. The ratio of the distance L211A to the radius of the shoulder portion 207 (the distance L211×½) falls within the range of 50% to 90%, preferably within the range of 53% to 88%, further preferably within the range of 53% to 86%.

Figure 8:
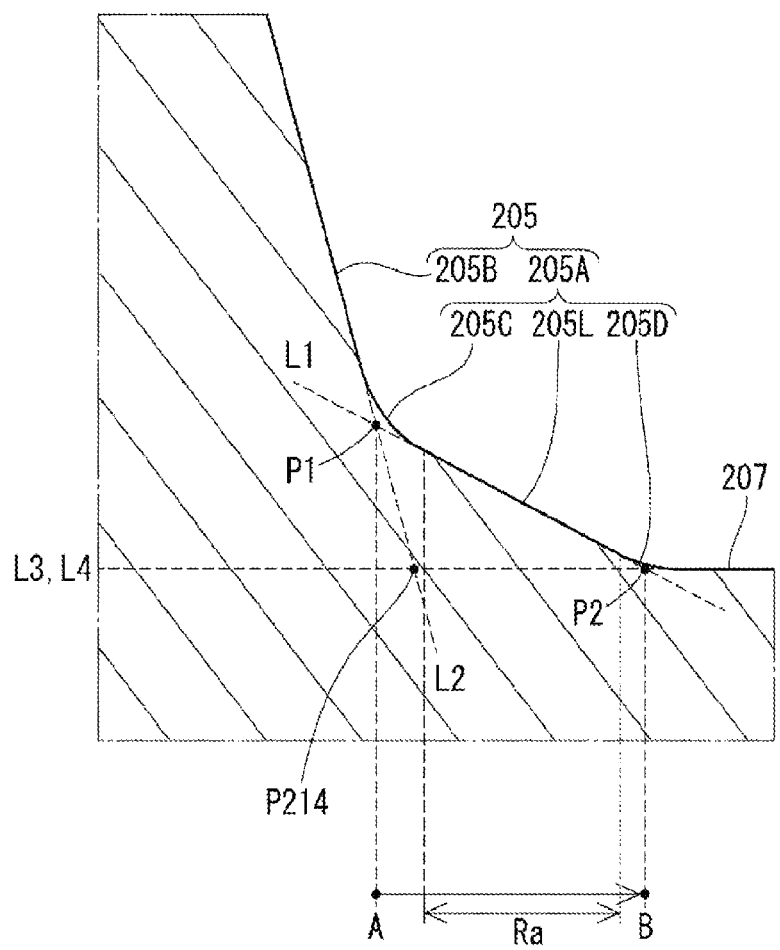
FIG. 8 Enlarged view showing, on an enlarged scale, a portion of the friction stir welding tool showing in FIG. 7.

FIG. 8 is an enlarged view showing, on an enlarged scale, the straight portion 205L of the skirt region 205A on the right side in FIG. 7 and its vicinity. In the cross section shown in FIG. 8, the visible outline of the skirt region 205A includes connecting portions 205C and 205D on both sides of the straight portion 205L. The connecting portion 205C is provided between the upper end of the straight portion 205L and the lower end of the distal-end-side region 205B. The connecting portion 205C has an arc shape for smoothly connecting the straight portion 205L and the distal-end-side region 205B. The connecting portion 205D is provided between the lower end of the straight portion 205L and the bottom surface (upper bottom surface) of the shoulder portion 207. The connecting portion 205D has an arc shape for smoothly connecting the straight portion 205L and the bottom surface (upper bottom surface) of the shoulder portion 207. The connecting portions 205C and 205D are not required to have an arc shape whose curvature is constant. Similarly, the skirt region 205A on the left side of FIG. 7 has the connecting portions 205C and 205D.

A range in the skirt region 205A where the straight portion 205L is provided will be described with reference to FIG. 8. In the cross section shown in FIG. 8, a coordinate system is set such that the point P1 (the point of intersection of the straight line L1 containing the straight portion 205L and the straight line L2 containing the visible outline of the distal-end-side region 205B) serves as the origin A, and its coordinate axis extends toward the outer side (the side opposite the center axis C) in a horizontal direction (the direction orthogonal to the center axis C). The position of the point P2 (the point of intersection of the straight line L1 containing the straight portion 205L and the extension line L3 of the bottom surface (upper bottom surface) of the shoulder portion 207) in this coordinate system is denoted by B. When the distance from the origin A to the position B is regarded as 100%, the range Ra in the coordinate system where the straight portion 205L is provided ranges preferably from 20% to 90%, more preferably from 25% to 80%, further preferably from 30% to 80%, from the viewpoint of enhancing wear resistance of the friction stir welding tool 201 and preventing breakage.

The friction stir welding tool 201 is formed of the same material as the friction stir welding tool 1 of the first embodiment. The friction stir welding tool 201 preferably has a coating layer (not shown) having the same configuration as that in the first embodiment.

From the viewpoint of increasing the amount of heat generation, the diameter of the shoulder portion 207 is 35 mm or greater, preferably 37 mm or greater, more preferably 42 mm or greater. From the viewpoint of restraining escape of heat, the diameter of the shoulder portion 207 is 50 mm or less, preferably 49 mm or less, more preferably 48 mm or less. From these viewpoints, the diameter of the shoulder portion 207 falls within the range of 35 mm to 50 mm, preferably within the range of 37 mm to 49 mm, more preferably within the range of 42 mm to 48 mm.

From the viewpoint of preventing breakage of the tool, the ratio of the height of the probe portion 205 to the diameter of the shoulder portion 207 is preferably 0.50 or less, more preferably 0.40 or less, further preferably 0.35 or less. From the viewpoint of preventing generation of defects, the ratio of the height of the probe portion 205 to the diameter of the shoulder portion 207 is preferably 0.15 or greater, more preferably 0.18 or greater, further preferably 0.20 or greater. From these viewpoints, the ratio of the height of the probe portion 205 to the diameter of the shoulder portion 207 falls preferably within the range of 0.15 to 0.50, more preferably within the range of 0.18 to 0.40, further preferably within the range of 0.20 to 0.35.

In the friction stir welding tool 201, in the cross section shown in FIG. 7, the diameter of the probe portion 205 at its root is equal to the distance L213 between points P213 and P214 where the extension lines of the generating lines of the straight portions of the probe portion 205 intersect with the extension line L3 of the bottom surface (upper bottom surface) of the shoulder portion 207.

From the viewpoint of preventing generation of burrs, the ratio of the diameter of the probe portion 205 at its root to the diameter of the shoulder portion 207 is preferably 0.67 or less, more preferably 0.60 or less, further preferably 0.50 or less. From the viewpoint of securing the strength of the probe portion 205, the ratio of the diameter of the probe portion 205 at its root to the diameter of the shoulder portion 207 is preferably 0.30 or greater, more preferably 0.32 or greater, further preferably 0.35 or greater. From these viewpoints, the ratio of the diameter of the probe portion 205 at its root to the diameter of the shoulder portion 207 falls preferably within the range of 0.30 to 0.67, more preferably within the range of 0.32 to 0.60, further preferably within the range of 0.35 to 0.50.

It is preferred that the diameter of the shoulder portion 207 fall within the range of 35 mm to 50 mm, the ratio of the height of the probe portion 205 to the diameter of the shoulder portion 207 fall within the range of 0.20 to 0.35, and the ratio of the diameter of the probe portion 205 at its root to the diameter of the shoulder portion 207 fall within the range of 0.35 to 0.50.

(2) Friction Stir Welding Method

A friction stir welding method performed by using the friction stir welding tool 201 of the second embodiment is the same as the friction stir welding method performed by using the friction stir welding tool 1 of the first embodiment.

(3) Effects

The friction stir welding tool 201 of the second embodiment achieves the same effects as those achieved by the friction stir welding tool 1 of the first embodiment, and further achieves the following effects.

The friction stir welding tool 201 has a structure in which the skirt region 205A which expands toward the bottom surface (upper bottom surface) of the shoulder portion 207 is provided on the probe portion 205, and the skirt region 205A is larger than the distal-end-side region 205B in terms of the ratio of increase in outer diameter to height. With this configuration, a fillet portion can be formed at the connecting portion between the probe portion 205 and the shoulder portion 207, which can enhance the wear resistance. Furthermore, the skirt region 205A is configured in such a manner that, in a cross section containing the center axis C of the probe portion 205, at least one pair of straight portions 205L which are symmetric with resect to the center axis C appear in the visible outlines of the skirt region 205A; and, in the above-described cross section, the distance between the point of intersection P1 and the straight line L4 is 12% or greater and 55% or less of the height of the probe portion 205, wherein P1 is the point of intersection where the straight line L1 containing the straight portion 205L intersects with the straight line L2 containing the visible outline of the distal-end-side region 205B, and the straight line L4 is a straight line passing through the two points (the points P213 and P214) where the pair of straight lines L2 containing visible outlines of the region (the distal-end-side region 205B) of the probe portion 205 other than the skirt region 205A intersect with the straight line L3 containing the bottom surface (upper bottom surface) of the shoulder portion 207 (Condition 1), and the taper angle between the pair of straight portions 205L falls within the range of 60° to 160° (Condition 2). With this configuration, the following effects are yielded. By virtue of the provision of the skirt region 205A, a portion of the probe portion 205 where the diameter increases does not become excessively large, so that the load acting on a welding apparatus which moves the tool can be reduced. In addition, the bottom surface of the shoulder portion 207 does not become excessively small, so that a flowing material can be easily pressed down.

Examples

The second embodiment will be described further specifically by way of examples.

(1) Friction Stir Welding Tool

A material containing a "sialon phase" and a "grain boundary phase" was used as the base materials of the friction stir welding tools of Examples 1 to 10 and Comparative example 1. The "sialon phase" contains α sialon and β sialon represented by $Si_{6-z}Al_zO_zN_{8-z}$. The value of Z is 0.2 or greater and 0.7 or less. The "grain boundary phase" is a portion where the boundaries between crystal grains appear.

Parameters relating to the shapes of the friction stir welding tools of Examples 1 to 10 and Comparative example 1 are shown in Table 2 shown below. A pair of straight portions were provided in the skirt region of the probe portion of each of the friction stir welding tools of Examples 6 to 10.

In Examples 6 to 10, the ratio of the height of the skirt region to the height of the probe portion was 50%, 32%, 23%, 23%, or 17%, respectively. The height of the skirt region is equal to the distance between the point of intersection where the straight line containing the straight portion intersects with the straight line containing the visible outline of the region (the distal-end-side region) of the probe portion other than the skirt region, and the straight line passing through two points where the pair of straight lines containing the visible outlines of the region (the distal-end-side region) of the probe portion other than the skirt region intersect with the straight line containing the bottom surface (upper bottom surface) of the shoulder portion.

In Examples 6 to 10, the ratio, to the radius of the shoulder portion, of the distance between the center axis and the point where the straight line containing the straight portion intersects with the extension line of the bottom surface (upper bottom surface) of the shoulder portion was 55%, 55%, 62%, 82%, or 86%, respectively.

TABLE 2

| | Diameter of shoulder portion (mm) | Height of probe portion (mm) | Diameter of probe portion at root (mm) | Height of probe portion/ Diameter of shoulder portion | Diameter of probe portion at root/ Diameter of shoulder portion | Taper angle between pair of straight portions (°) | Ratio of Height of skirt portion in probe portion (%) | Welding distance (mm) | Surface defect | Tool breakage |
|---|---|---|---|---|---|---|---|---|---|---|
| Ex. 1 | 37.5 | 14.75 | 18.49 | 0.39 | 0.49 | — | — | 500 | No defect | Not occurred |
| Ex. 2 | 42.5 | 12.63 | 17.46 | 0.30 | 0.41 | — | — | 900 | No defect | Not occurred |
| Comp. Ex. 1 | 30.0 | 14.75 | 18.49 | 0.49 | 0.62 | — | — | 500 | No defect | Occurred |
| Ex. 3 | 42.5 | 21.75 | 23.0 | 0.51 | 0.54 | — | — | 500 | No defect | Not occurred |
| Ex. 4 | 42.5 | 14.75 | 30.0 | 0.35 | 0.71 | — | — | 600 | No defect | Not occurred |

TABLE 2-continued

|  | Diameter of shoulder portion (mm) | Height of probe portion (mm) | Diameter of probe portion at root (mm) | Height of probe portion/ Diameter of shoulder portion | Diameter of probe portion at root/ Diameter of shoulder portion | Taper angle between pair of straight portions (°) | Ratio of Height of skirt portion in probe portion (%) | Welding distance (mm) | Surface defect | Tool breakage |
|---|---|---|---|---|---|---|---|---|---|---|
| Ex. 5 | 35.0 | 14.75 | 18.0 | 0.42 | 0.51 | — | — | 500 | No defect | Not occurred |
| Ex. 6 | 42.5 | 12.57 | 17.79 | 0.30 | 0.42 | 70 | 50 | 900 | No defect | Not occurred |
| Ex. 7 | 42.5 | 10.56 | 16.45 | 0.25 | 0.39 | 90 | 32 | 2000 | No defect | Not occurred |
| Ex. 8 | 42.5 | 12.57 | 17.79 | 0.30 | 0.42 | 110 | 23 | 2000 | No defect | Not occurred |
| Ex. 9 | 42.5 | 12.57 | 17.79 | 0.30 | 0.42 | 130 | 23 | 1500 | No defect | Not occurred |
| Ex. 10 | 42.5 | 14.75 | 19.16 | 0.35 | 0.45 | 150 | 17 | 1000 | No defect | Not occurred |

(2) Welding Conditions

Friction stir welding was performed for 15 mm-thick steel plates (low carbon steel) by using the friction stir welding tools of Examples 1 to 10 and Comparative example 1. Welding was performed along the boundary between the two steel plates (abutting surfaces of the two steel plates). The rotational speed of the friction stir welding tool was 200 rpm, the welding speed was 50 mm/min, and the advance angle was 1°.

(3) Results

The results are also described in Table 2 and the results are considered.

Examples 1 to 10 satisfy the following requirement (a). Comparative example 1 does not satisfy the following requirement (a).

Requirement (a): The diameter of the shoulder portion is 35 mm or greater.

Since the friction stir welding tools of Examples 1 to 10 satisfy the requirement (a), the friction stir welding tools of Examples 1 to 10 were able to perform surface defect-free welding over 500 mm to 2000 mm without causing tool breakage. Meanwhile, since the friction stir welding tool of Comparative example 1 does not satisfy the requirement (a), a part of the friction stir welding tool of Comparative example 1 was broken after welding over 500 mm. Conceivably, the above results occurred because, in Examples 1 to 10, the amount of heat input to steel plates was larger as compared with that in Comparative example 1.

Examples 6 to 10 satisfy the following requirements (b) and (C). Examples 1 to 5 and Comparative example 1 do not satisfy the following requirement (b) and (c).

Requirement (b): In a cross section containing the center axis of the probe portion, the distance between the point of intersection where the straight line containing the straight portion intersects with the straight line containing the visible outline of the region of the probe portion other than the skirt region, and the straight line passing through two points where the pair of straight lines containing the visible outlines of the region of the probe portion other than the skirt region intersect with the straight line containing the bottom surface (upper bottom surface) of the shoulder portion is 12% or greater and 55% or less of the height of the probe portion.

Requirement (c): The taper angle between the pair of straight portions falls within the range of 60° to 160°.

Since the friction stir welding tools of Examples 6 to 10 satisfy the requirements (b) and (C), the friction stir welding tools of Examples 6 to 10 were able to perform welding over 900 mm or more. Meanwhile, the friction stir welding tools of Examples 1 to 5 and Comparative example 1 do not satisfy the requirements (b) and (c), and were able to perform welding over 900 mm or less. Conceivably, the above results occurred for the following reason. In Examples 6 to 10, in particular in Examples 7 and 8, wear resistance of the friction stir welding tool was enhanced efficiently, as compared with Examples 1 to 5 and Comparative example 1, because the skirt region satisfying the requirements (b) and (c) is provided on the probe portion.

(4) Effects of Examples

Examples 1 to 10 enable welding of steel plates of 15 mm thick, thereby expanding the range of industrial application. Examples 1 to 10 enable provision of friction stir welding tools at inexpensive prices as compared with tools using PCBN.

3. Other Embodiments

The present disclosure is not limited to the embodiments described in detail above, and various modifications or changes are possible.

Figure 9:
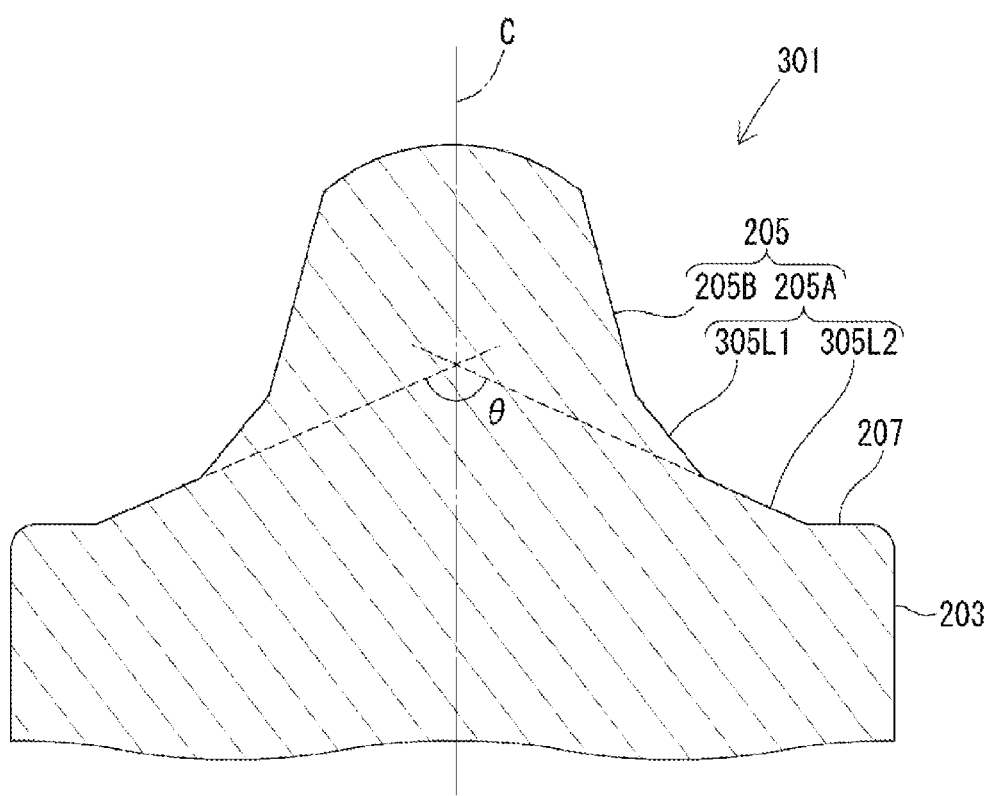
FIG. 9 Perspective view showing one example of a friction stir welding tool of another embodiment.

A plurality of pairs of straight portions may be provided in the skirt region, unlike the above-described friction stir welding tool of the second embodiment. For example, as in a cross section of a friction stir welding tool 301 (cross section containing the center axis C of a probe portion 205) shown in FIG. 9, two pairs of straight portions (straight portions 305L1 and 305L2) may be provided in the skirt region 205A. The friction stir welding tool is only required to be configured such that, of the plurality of pairs of straight portions, at least one pair of straight portions (for example, the straight portions 305L2 in FIG. 9) satisfy the above-described conditions (1) and (2).

In the above-described friction stir welding tool of the second embodiment, a straight portion is provided in the skirt region of the probe portion. However, the shape of the skirt region is not limited thereto. For example, the skirt region of the probe portion may be configured such that, in the cross section containing the center axis of the probe portion, at least one pair of arc portions which are symmetric with resect to the center axis C appear in the visible outlines of the skirt region. Each of the arc portions is a part of a circle which is in contact with the probe portion and the bottom surface of the shoulder portion. For example, as in a cross section of a friction stir welding tool 401 (cross section containing the center axis C of a probe portion 405) shown in FIG. 10, a skirt region 405A may be configured such that a pair of arc portions 405R which are symmetric with respect to the center axis appear in the visible outlines of the skirt region 405A. Each of the arc portions 405R is a part of a circle that is in contact with the probe portion 405 and the bottom surface (upper bottom surface) of the shoulder portion 207 (a circle shown by an alternate long and short dash line in FIG. 10).

In the friction stir welding tool 401 shown in FIG. 10, from the viewpoints of enhancing wear resistance and preventing tool breakage, the radius of curvature of the arc portion 405R falls preferably within the range of 2 mm to 12 mm, more preferably within the range of 3 mm to 11 mm, further preferably within the range of 4 mm to 10 mm.

In the above-described friction stir welding tool of the second embodiment, the shape of the probe portion is not limited to the shape shown in FIG. 7, but may be a shape inclined with respect to the center axis C as shown in FIGS. 4 and 5.

DESCRIPTION OF REFERENCE NUMERALS

1: friction stir welding tool
3: body portion
5: probe portion
7: shoulder portion
201: friction stir welding tool
203: body portion
205: probe portion
205A: skirt region
205B: distal-end-side region (region other than the skirt region)
205L: straight portion
207: shoulder portion
301: friction stir welding tool
305L1, 305L2: straight portion
401: friction stir welding tool
405: probe portion
405A: skirt region
405R: arc portion

The invention claimed is:

1. A friction stir welding tool having a shoulder portion and a probe portion provided on a bottom surface of the shoulder portion, wherein
a ceramic material whose main phase is silicon nitride or sialon is used as a base material, and
a diameter of the shoulder portion is 35 mm or greater;
wherein the probe portion comprises a distal end side and a proximal end side, wherein the probe further comprises a skirt region provided on the proximal end side of the probe portion that expands toward the bottom surface of the shoulder portion;
wherein the skirt region has an outer diameter and an approximately truncated conical shape such that its outer diameter increases gradually from the distal end side toward the bottom surface of the shoulder portion;
wherein the probe portion further comprises a distal end side region provided on the probe portion on an upper end side compared to the skirt region;
wherein the distal end side region has an outer diameter and an approximately truncated conical shape such that its outer diameter increases gradually from the distal end side toward the bottom surface of the shoulder portion;
wherein the skirt region is larger than the distal end side region of the probe portion in terms of a ratio of increase in outer diameter to height; and
wherein, in a cross section containing a center axis of the probe portion, at least one pair of straight portions that are symmetric with respect to the center axis, appear in a visible outline of the skirt region and satisfy the following conditions (1) and (2):
condition (1): in the cross section, a distance between a point of intersection where a straight line containing the straight portion intersects with a straight line containing a visible outline of the region of the probe portion other than the skirt region, and a straight line passing through two points where a pair of straight lines containing the visible outlines of the region of the probe portion other than the skirt region intersect with a straight line containing the bottom surface of the shoulder portion, is 12% or greater and 55% or less of the height of the probe portion; and
condition (2): a taper angle between the pair of straight portions is 60° or greater and 160° or less, wherein the taper angle is a vertical angle formed between extensions of the straight portions intersecting.

2. The friction stir welding tool according to claim 1, wherein a ratio of a height of the probe portion to the diameter of the shoulder portion is 0.5 or less.

3. The friction stir welding tool according to claim 1, wherein a ratio of a diameter of the probe portion at its root to the diameter of the shoulder portion is 0.67 or less.

4. The friction stir welding tool according to claim 1, having a coating layer formed of TiN.

5. A friction stir welding method in which plates having a thickness of 15 mm or greater are welded together by the friction stir welding tool set forth in claim 1.

* * * * *